(12) United States Patent
Yamamoto (10) Patent No.: US 7,391,139 B2
(45) Date of Patent: Jun. 24, 2008

(54) SPINDLE MOTOR AND ROTATION APPARATUS

(75) Inventor: Takeyoshi Yamamoto, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 327 days.

(21) Appl. No.: 11/322,379

(22) Filed: Jan. 3, 2006

(65) Prior Publication Data

US 2006/0158052 A1    Jul. 20, 2006

(30) Foreign Application Priority Data

Jan. 17, 2005    (JP)    ............................. 2005-008807

(51) Int. Cl.
*H02K 5/16* (2006.01)
*H02K 7/08* (2006.01)
*F16C 17/10* (2006.01)
*F16C 33/10* (2006.01)
*G11B 19/02* (2006.01)
*G11B 33/00* (2006.01)

(52) U.S. Cl. .......................... 310/90; 384/107; 384/114; 360/98.07; 360/99.08; 360/99.11; 360/99.12

(58) Field of Classification Search ............... 310/67 R, 310/90; 384/100, 107, 110, 111, 112, 113, 384/114; 360/98.07, 99.08–99.12
See application file for complete search history.

(56) References Cited

U.S. PATENT DOCUMENTS

| | | | | |
|---|---|---|---|---|
| 4,934,836 A | * | 6/1990 | Tanaka et al. | ................ 384/100 |
| 5,357,162 A | * | 10/1994 | Aiyoshizawa et al. | ......... 310/90 |
| 6,176,618 B1 | * | 1/2001 | Kawawada et al. | .......... 384/107 |
| 6,412,984 B2 | * | 7/2002 | Asai et al. | .................... 384/107 |
| 6,554,475 B2 | * | 4/2003 | Yamada | ...................... 384/107 |
| 2003/0230943 A1 | | 12/2003 | Tokunaga et al. | |

FOREIGN PATENT DOCUMENTS

| JP | 2002276666 A | * | 9/2002 |
|---|---|---|---|
| JP | 2003294027 A | * | 10/2003 |
| JP | 2004-019705 | | 1/2004 |
| JP | 2004-052931 | | 2/2004 |
| JP | 2004-239387 | | 8/2004 |
| JP | 2004301339 A | * | 10/2004 |

* cited by examiner

*Primary Examiner*—Tran Nguyen
(74) *Attorney, Agent, or Firm*—Wenderoth, Lind & Ponack, L.L.P.

(57) ABSTRACT

A spindle motor which allows appropriate formation of communicating hole for compensating a pressure difference due to an error in working of dynamic pressure generating grooves and other components, easy formation of dynamic pressure generating grooves and readily prevention of leakage of a lubrication fluid is provided. An outer cylindrical member is attached to a shaft, a radial hydrodynamic bearing and a thrust hydrodynamic bearing are provided between the outer cylindrical member and the sleeve, and communicating holes are formed between the shaft and the outer cylindrical member, and between the hub and the outer cylindrical member. Since the collared outer cylindrical member is attached to the shaft, the communicating holes can be readily formed. Also, since a thrust hydrodynamic bearing is formed between an opening of a communicating hole and a seal, a lubrication fluid is unlikely to leak from the seal portion. The outer cylindrical member having the collar portion also enables easy formation of a thrust dynamic pressure generating groove, using inexpensive methods such as pressing.

11 Claims, 7 Drawing Sheets

Portion b

Portion c

Fig. 14

SPINDLE MOTOR AND ROTATION APPARATUS

BACKGROUND OF THE INVENTION

1. Field of the Invention

The present invention relates to a spindle motor and a rotation apparatus employing a hydrodynamic bearing.

2. Description of the Related Art

More and more hydrodynamic bearing devices are replacing ball bearing devices which have been conventionally used, as bearing devices used in spindle motors in hard discs, polygon mirrors, optical disc apparatuses and the like. The hydrodynamic bearing devices are superior to the ball bearings in a rotational accuracy and silent property. Also, more spindle motors are used in mobile computing devices. Thus, there is a need for further miniaturization of the spindle motors.

Figure 9:
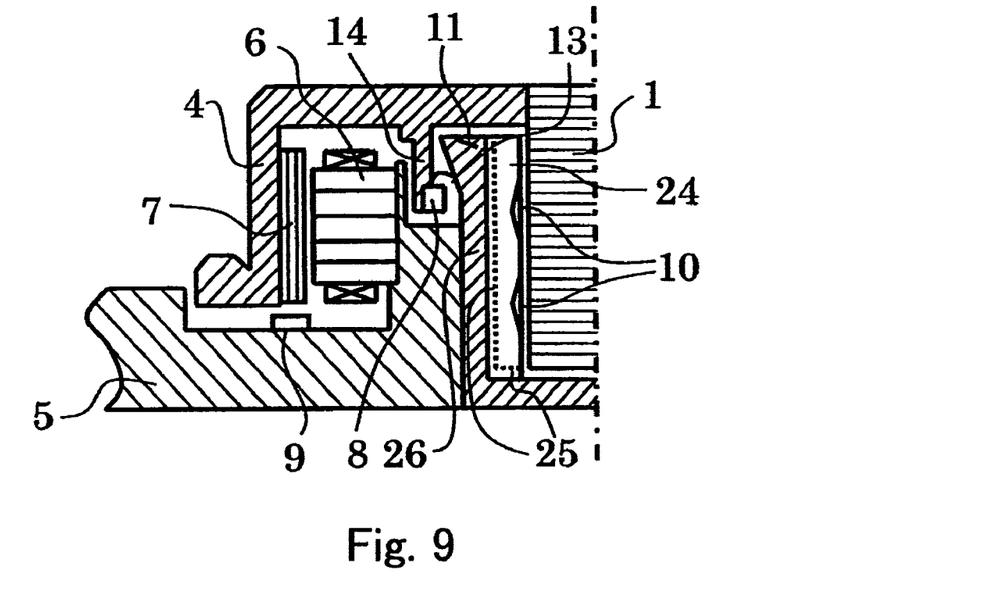
FIG. 9 is a cross-sectional view of an example of conventional spindle motors.
Figure 10:
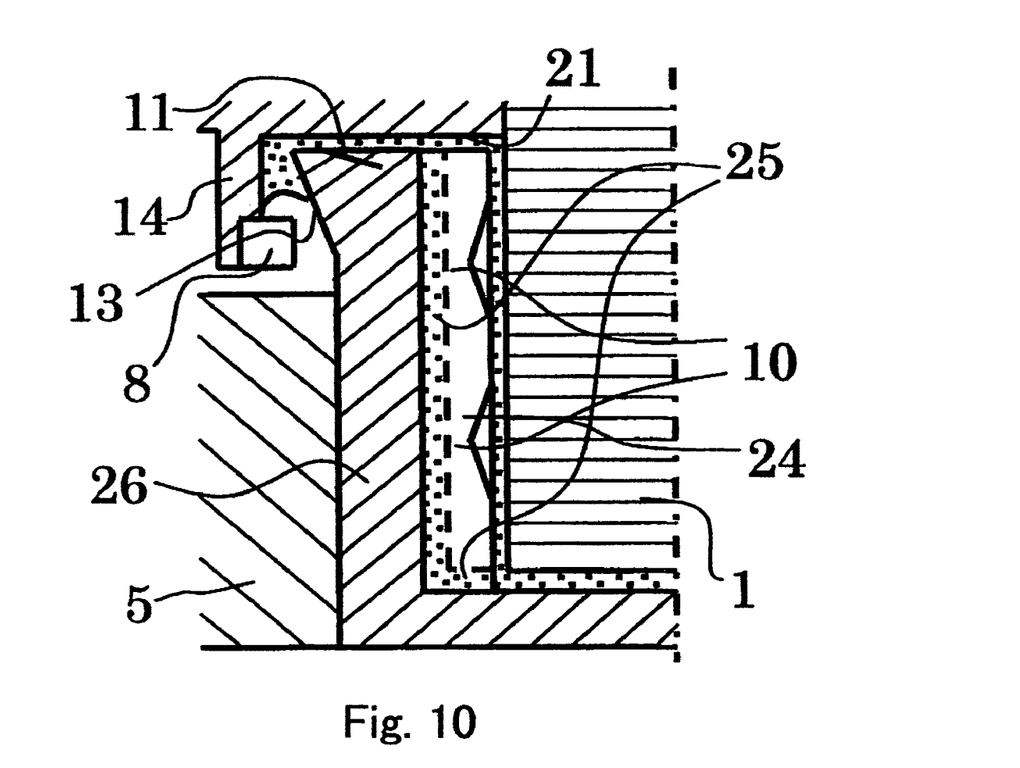
FIG. 10 is an enlarged cross-sectional view showing a portion near a bearing mechanism of the example of conventional spindle motors.

Japanese Laid-Open Publication No. 2004-19705 proposes a structure shown in FIGS. 9 and 10 as a bearing arrangement which enables miniaturization. As shown in FIGS. 9 and 10, a sleeve 24 has radial dynamic pressure generating grooves 10 formed on its inner peripheral surface and is covered with a bracket 26. A radial hydrodynamic bearing is formed between the inner peripheral surface of the sleeve 24 and an outer peripheral surface of a shaft 1. A thrust dynamic pressure generating groove 11 is formed on an upper surface of a shoulder portion of the bracket 26. A thrust hydrodynamic bearing is formed between the upper surface of the shoulder portion of the bracket 26 and a lower surface of a hub 4. Further, a lubrication oil as a working fluid is filled between the inner peripheral surface of the sleeve 24 and the outer peripheral surface of the shaft 1 and between the upper surface of the shoulder portion of the bracket 26 and the lower surface of the hub 4, covering at least portions which form the radial hydrodynamic bearing and the thrust hydrodynamic bearing. In this structure, communicating holes 25 for communication between an outer peripheral surface and a lower surface of the sleeve 24 and between an inner peripheral surface and an upper surface of the bracket 26 such that a lubrication fluid 31 can flow therethrough are formed. In this way, a pressure difference can be compensated through the communicating hole 25 even when the pressure difference is generated in the lubrication fluid 31 which is held between the inner peripheral surface of the sleeve 24 and the outer peripheral surface of the shaft 1 between upper and lower ends in an axial direction due to an error in working and the like of the dynamic pressure generating grooves and other components provided in the radial bearing portion. Thus, bubbles due to a negative pressure in the lubrication fluid 31 and the case of excessive floating of the rotor can be suppressed. In the case where the sleeve 24 and the bracket 26 are integrally formed, forming the communicating hole 25 is difficult since it is necessary to form a narrow and long hole with drilling or the like. However, if the sleeve 24 and the bracket 26 are separate pieces as in the above-described structure, it is easy to form a communicating hole because a groove provided on the peripheral outer surface of the sleeve 24 or the inner peripheral surface of the bracket 26 can serve as a communicating hole when the sleeve 24 and the bracket 26 are assembled.

Figure 11:
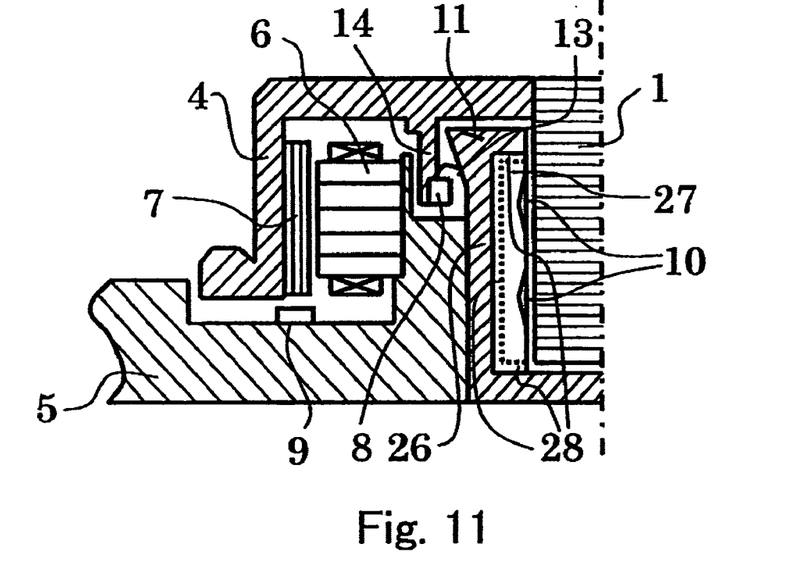
FIG. 11 is a cross-sectional view of another example of conventional spindle motors.
Figure 12:
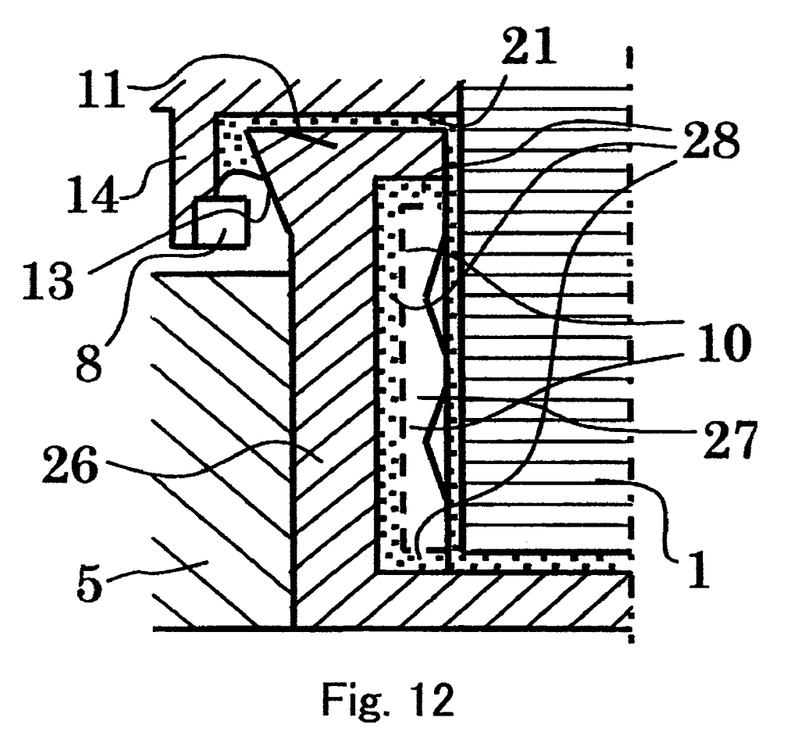
FIG. 12 is an enlarged cross-sectional view showing a portion near a bearing mechanism of another example of conventional spindle motors.

Japanese Laid-Open Publication No. 2004-52931 discloses a structure shown in FIGS. 11 and 12. In the structure, upper and lower surfaces of a sleeve 27 in an axial direction are covered with a bracket 26 and a communicating hole 28 is formed into a squared-c shape.

Figure 13:
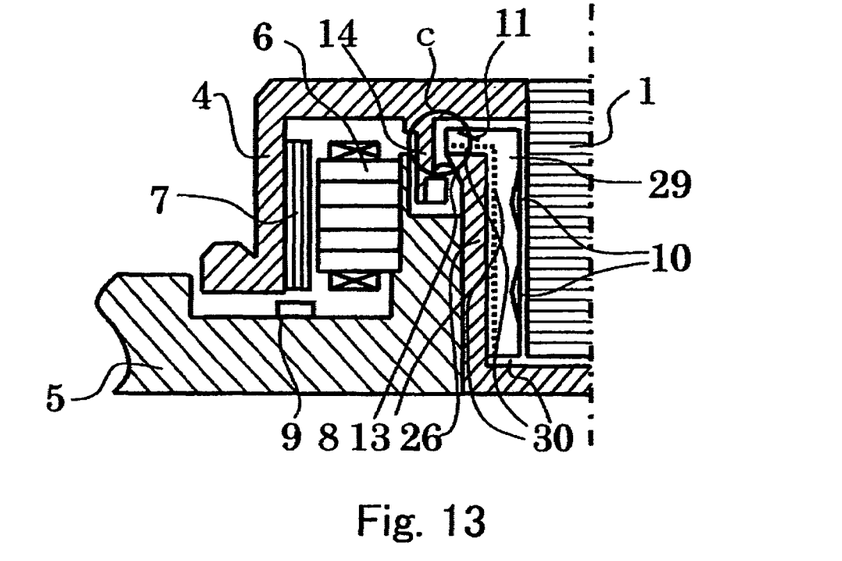
FIG. 13 is a cross-sectional view of yet another example of conventional spindle motors.
Figure 14:
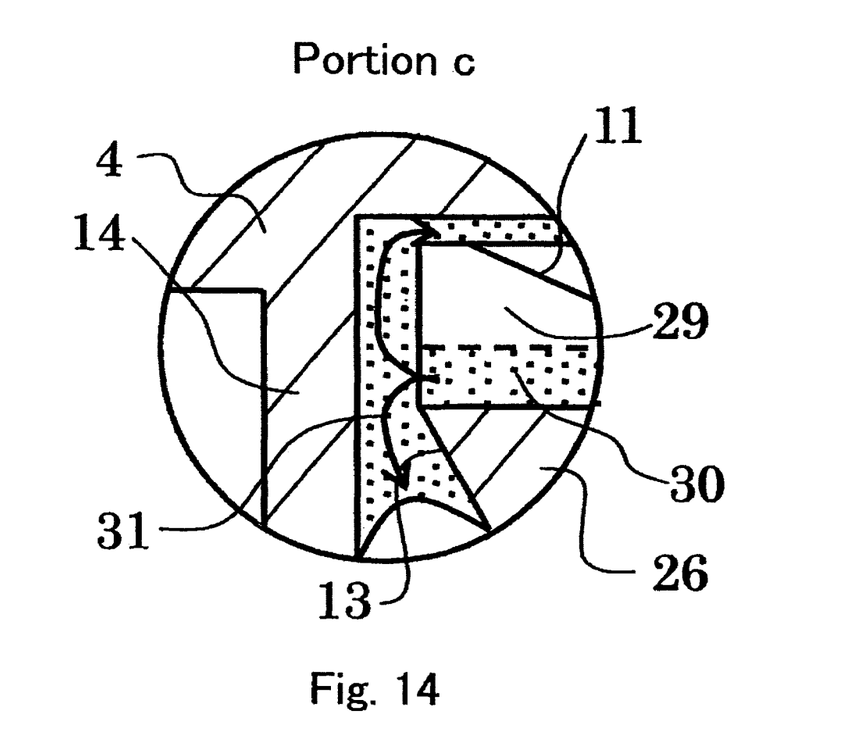
FIG. 14 is an enlarged cross-sectional view showing a portion near a bearing mechanism of yet another example of conventional spindle motors.

Japanese Laid-Open Publication No. 2004-239387 discloses a structure shown in FIGS. 13 and 14. In the structure, a flanged sleeve 29 has radial dynamic pressure generating grooves 10 and thrust dynamic pressure generating grooves 11 respectively formed on its inner peripheral surface and an upper surface of a flange portion. The flanged sleeve 29 is covered with a bracket 26. A radial hydrodynamic bearing is formed between the inner peripheral surface of the flanged sleeve 29 and an outer peripheral surface of a shaft 1. A thrust hydrodynamic bearing is formed between the upper surface of the flange portion of the flanged sleeve 29 and a lower surface of a hub 4. In this structure, communicating holes 30 are formed between an outer peripheral surface of the flanged sleeve 29 and a lower surface of the flange portion and between an inner peripheral surface of the bracket 26 and an upper surface of a shoulder portion.

However, spindle motors having conventional structures disclosed in Japanese Laid-Open Publication Nos. 2004-19705 and 2004-52931 have following problems. Since they do not have a communicating hole formed in the thrust bearing portion, a pressure difference is not compensated when the pressure difference is generated between inner and outer peripheral portions of the thrust bearing due to an error in working and the like of the thrust dynamic pressure generating grooves 11 and other components. Thus, bubbles due to a negative pressure in the lubrication fluid 31 and the case of excessive floating of the rotor cannot be suppressed. Further, since thrust dynamic pressure generating grooves are formed on the upper surface of the shoulder portion of the bracket 26 which has a very small area, it is difficult to improve a surface shape of the upper surface of the shoulder portion and a processing precision of the thrust dynamic pressure generating groove. For similar reason, thrust dynamic pressure generating grooves cannot be formed by inexpensive methods such as pressing. This makes difficult to reduce the processing cost.

On the other hand, in the spindle motor having the conventional structure disclosed in Japanese Laid-Open Publication No. 2004-239387, the communicating holes 30 are formed between the outer peripheral portion of the thrust bearing and the lower portion of the radial bearing by employing the flanged sleeve 29. Thus, even when a pressure difference is generated due to an error in working and the like of the thrust dynamic pressure generating grooves 11 and other components, bubbles due to a negative pressure in the lubrication fluid 31 and the case of excessive floating of the rotor can be suppressed. Moreover, since the flanged sleeve 29 is employed, the thrust dynamic pressure generating grooves can be formed easily by inexpensive methods such as pressing.

However, as shown in an enlarged view of a bearing opening in FIG. 14, the communicating hole 30 is opened near the taper portion 13. When the lubrication fluid 31 flows from the lower portion of the radial bearing to the outer peripheral portion of the thrust bearing, not all of the lubrication fluid 31 can enter the thrust bearing. The lubrication fluid 31 tends to leak from a seal formed by the taper portion 13 and a cylindrical wall portion 14.

SUMMARY OF THE INVENTION

An object of the present invention is to provide a spindle motor in which communicating holes for compensating a pressure difference due to an error in working or the like of dynamic pressure generating grooves and other components are appropriately formed, the dynamic pressure generating grooves are readily formed, and leakage of a lubrication fluid is readily prevented.

According to one aspect of the present invention, there is provided a spindle motor comprising a stationary member and a rotational member which is rotatable with respect to the stationary member via a radial bearing portion and a thrust bearing portion, wherein: the rotational member includes a shaft, and an outer cylindrical member and a rotor hub attached to the shaft, the outer cylindrical member being formed of an cylindrical portion and a collar portion extending from one end of the cylindrical portion in a direction perpendicular to an outer peripheral surface; the stationary member includes a sleeve member having an inner peripheral surface opposing an outer peripheral surface of the cylindrical portion of the outer cylindrical member in a radial direction, and an upper surface opposing a lower surface of the collar portion of the outer cylindrical member in an axial direction; the radial bearing portion is formed of a fluid between the outer peripheral surface of the cylindrical portion of the outer cylindrical member and the inner peripheral surface of the sleeve opposing it in the radial direction, and a dynamic pressure generating groove formed on at least one of the outer peripheral surface of the cylindrical portion of the outer cylindrical member and the inner peripheral surface of the sleeve; and the thrust bearing portion is formed of a fluid between the lower surface of the collar portion of the outer cylindrical member and the upper surface of the sleeve opposing it in the axial direction, and a dynamic pressure generating groove formed on at least one of the lower surface of the collar portion of the outer cylindrical member and the upper surface of the sleeve.

In one embodiment of the present invention, a spindle motor comprises a communicating hole for communication between an outer peripheral surface of the shaft and an inner peripheral surface of the outer cylindrical member, and between a lower surface of the rotor hub and an upper surface of the outer cylindrical member such that a fluid can flow therethrough.

According to one aspect of the present invention, there is provided a spindle motor comprising a stationary member and a rotational member which is rotatable with respect to the stationary member via a radial bearing portion and a thrust bearing portion, wherein: the rotational member includes a shaft, and first and second cylindrical outer cylindrical members attached to the shaft, the second outer cylindrical member having an outer diameter larger than that of the first outer cylindrical member; the stationary member includes a sleeve member having an internal peripheral surface opposing an outer peripheral surface of the first outer cylindrical member in a radial direction, and an upper surface opposing a lower surface of the second outer cylindrical member in an axial direction; the radial bearing portion is formed of a fluid between the outer peripheral surface of the first outer cylindrical member and the inner peripheral surface of the sleeve opposing it in the radial direction, and a dynamic pressure generating groove formed on at least one of the outer peripheral surface of the first outer cylindrical member and the inner peripheral surface of the sleeve; and the thrust bearing portion is formed of a fluid between the lower surface of the second outer cylindrical member and the upper surface of the sleeve opposing it in the axial direction, and a dynamic pressure generating groove formed on at least one of the lower surface of the second outer cylindrical member and the upper surface of the sleeve.

In one embodiment of the present invention, a spindle motor comprises at least two of communicating holes for communication between an outer peripheral surface of the shaft and an inner peripheral surface of the first outer cylindrical member, between an outer peripheral surface of the shaft and an inner peripheral surface of the second outer cylindrical member, between a lower surface of the rotor hub and an upper surface of the second outer cylindrical member, and between the first outer cylindrical member and the second outer cylindrical member such that a fluid can flow therethrough.

According to one aspect of the present invention, there is provided a spindle motor comprising a stationary member and a rotational member which is rotatable with respect to the stationary member via a radial bearing portion and a thrust bearing portion, wherein: the rotational member includes a shaft, and a cylindrical outer cylindrical member and a rotor hub attached to the shaft, the rotor hub having a cylindrical inner cylindrical member attached thereto; the stationary member includes a sleeve member having an internal peripheral surface opposing an outer peripheral surface of the outer cylindrical member in a radial direction, and an upper surface opposing a lower surface of the inner cylindrical member in an axial direction; the radial bearing portion is formed of a fluid between the outer peripheral surface of the outer cylindrical member and the inner peripheral surface of the sleeve opposing it in the radial direction, and a dynamic pressure generating groove formed on at least one of the outer peripheral surface of the outer cylindrical member and the inner peripheral surface of the sleeve; and the thrust bearing portion is formed of a fluid between the lower surface of the inner cylindrical member and the upper surface of the sleeve opposing it in the axial direction, and a dynamic pressure generating groove formed on at least one of the lower surface of the inner cylindrical member and the upper surface of the sleeve.

In one embodiment of the present invention, a spindle motor comprises at least two of communicating holes for communication between an outer peripheral surface of the shaft and an inner peripheral surface of the outer cylindrical member, between an inner peripheral surface of the rotor hub and an outer peripheral surface of the inner cylindrical member, between a lower surface of the rotor hub and an upper surface of the inner cylindrical member, and between the outer cylindrical member and the inner cylindrical member such that a fluid can flow therethrough.

In one embodiment of the present invention, the outer cylindrical member and the inner cylindrical member are formed of a porous metal material.

In one embodiment of the present invention, the outer cylindrical member and the inner cylindrical member are formed of copper or a copper-based material.

In one embodiment of the present invention, the outer cylindrical member and the inner cylindrical member are formed of a stainless steel.

In one embodiment of the present invention, the outer cylindrical member and the inner cylindrical member are formed of a resin material.

In one embodiment of the present invention, a cylindrical wall portion extending downward in the axial direction and opposing an outer peripheral surface of the sleeve with a gap interposed therebetween is formed on the lower surface of the rotor hub outside the thrust bearing portion in the radial direction; and a seal portion utilizing a capillary mechanism is provided between an inner peripheral surface of the cylindrical wall portion and the outer peripheral surface of the sleeve.

In one embodiment of the present invention, the seal portion includes at least one taper portion on at least one of the inner peripheral surface of the cylindrical wall portion and the outer peripheral surface of the sleeve such that the seal portion has a cross section that a gap between the inner peripheral surface of the cylindrical wall portion and the outer peripheral surface of the sleeve gradually increase as it becomes far from the thrust bearing portion.

In one embodiment of the present invention, the seal portion includes at least one stepped portion on at least one of the inner peripheral surface of the cylindrical wall portion and the outer peripheral surface of the sleeve such that the seal portion has a cross section that a gap between the inner peripheral surface of the cylindrical wall portion and the outer peripheral surface of the sleeve gradually increase as it becomes far from the thrust bearing portion.

In one embodiment of the present invention, a rotor magnet is attached to the rotating member and a stator core is attached to a position on the stationary member which opposes the rotor magnet.

In one embodiment of the present invention, a rotated body such as polygon mirrors or recording discs is to be attached to the rotating member.

According to the present invention, a collared outer cylindrical member is attached to a shaft. Thus, a communicating hole for communication between a lower portion of a radial hydrodynamic bearing and an outer peripheral portion of a thrust hydrodynamic bearing can be formed easily. Further, since a thrust hydrodynamic bearing is located between an opening of the communicating hole and a seal, a lubrication fluid enters the thrust hydrodynamic bearing when it flows out from the communicating hole, and thus, the lubricating fluid is less likely to leak out from the seal. Further, employing the outer cylindrical member having a collar portion allows a thrust dynamic pressure generating groove to be formed easily even by inexpensive methods such as pressing.

DESCRIPTION OF THE PREFERRED EMBODIMENTS

Hereinafter, embodiments of a spindle motor and a rotation apparatus according to the present invention will be described with reference to the drawings.

Embodiment 1

Figure 1:
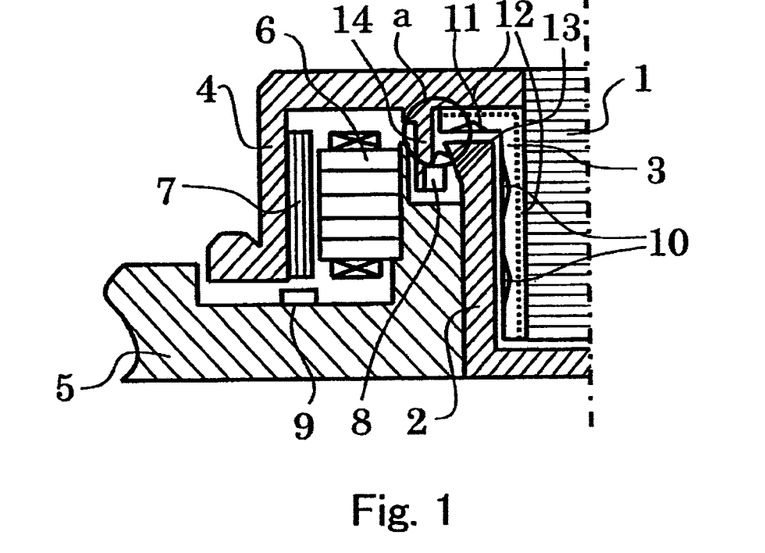
FIG. 1 is a cross-sectional view of a spindle motor according to Embodiment 1 of the present invention.
Figure 2:
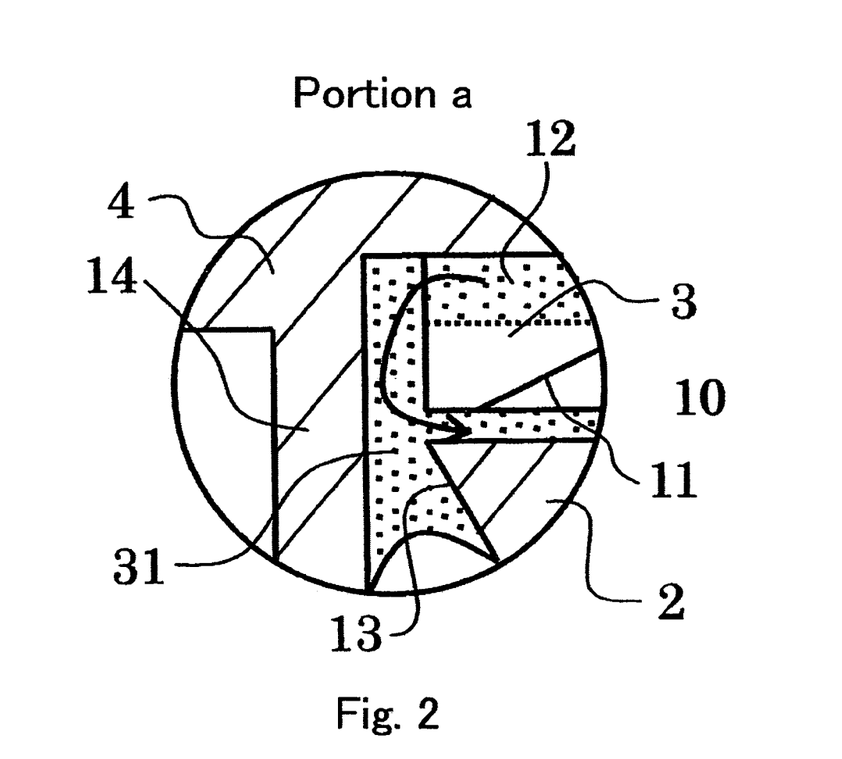
FIG. 2 is an enlarged cross-sectional view showing a portion near a first sealing mechanism according to the present invention.

FIG. 1 is a cross-sectional view of a spindle motor according to Embodiment 1 of the present invention. FIG. 2 is an enlarged view of a portion near a seal. The spindle motor includes a shaft 1 and a hub 4 attached to the shaft 1 which form a rotor rotating with the shaft 1 being a central axis. The spindle motor further includes a collared outer cylindrical member 3 attached to the shaft 1 and a sleeve 2 located outside the collared outer cylindrical member 3 with a small space interposed therebetween which form a bearing. The rotor including the shaft 1 is supported so as to be rotatable with respect to the sleeve 2. The sleeve 2 is attached to a base 5 and forms a stator.

On a lower inner peripheral surface of the hub 4, a magnet 7 having a circle shape is attached. The magnet 7 is multipole-magnetized in a circumferential direction. Stator cores 6 are attached to the base 5 at the positions opposing the magnet 7 in the circumferential direction. When controlled currents flow through a plurality of the stator cores 6, a rotational force is generated between the stator cores 6 and the magnet 7 and the stator cores 6 function as a driving mechanism rotating the rotor with respect to the stator.

A lubrication fluid 31 is filled between an outer peripheral surface of the collared outer cylindrical member 3 and an inner peripheral surface of the sleeve 2. Radial dynamic pressure generating grooves 10 having a herringbone pattern are formed in two places on at least one of the outer peripheral surface of the collared outer cylindrical member 3 and the inner peripheral surface of the sleeve 2. When the collared outer cylindrical member 3 rotates, a dynamic pressure is generated between the outer peripheral surface of the collared outer cylindrical member 3 and the inner peripheral surface of the sleeve 2 to form a radial hydrodynamic bearing. The radial hydrodynamic bearing allows the collared outer cylindrical member 3 to be supported in a radial direction with respect to the sleeve 2 without contact. In Embodiment 1, the radial dynamic pressure generating grooves 10 have a herringbone pattern. However, they may have a spiral pattern or a three circular arc pattern. Further, in Embodiment 1, the radial dynamic pressure generating grooves 10 are formed in two places, but it may be formed in one place or three places or more.

A lubrication fluid 31 is filled between a lower surface of a collar portion of the collared outer cylindrical member 3 and an upper surface of the sleeve 2. A thrust dynamic pressure generating groove 11 having a herringbone pattern is formed on at least one of the lower surface of the collar portion of the collared outer cylindrical member 3 and the upper surface of the sleeve 2. When the collared outer cylindrical member 3 is rotated, a dynamic pressure is generated between the lower surface of the collar portion of the collared outer cylindrical member 3 and the upper surface of the sleeve 2 to form a thrust hydrodynamic bearing. The thrust hydrodynamic bearing allows the collared outer cylindrical member 3 to be supported in an axial direction with respect to the sleeve 2 without contact. In Embodiment 1, the thrust dynamic pressure generating groove 11 has a herringbone pattern. However, it may have a spiral pattern or a step pattern. It is desirable that a pumping-in pattern by which the lubrication fluid 31 is directed inward in the radial direction by a dynamic pressure is used.

A suction ring 9 formed of a magnetic material is attached to the base 5. A magnetic attraction force in the axial direction is generated between the suction ring 9 and the magnet 7. It is balanced with the dynamic pressure generated in the thrust hydrodynamic bearing to stabilize a support of the rotor in the axial direction. Such magnetizing can also be achieved by shifting magnetic centers of the stator core 6 and the magnet 7 in the axial directions.

In an upper outer peripheral portion of the sleeve 2, a taper portion 13 is extending outward with the shaft 1 being the center. On a lower surface of the hub 4 outside the thrust hydrodynamic bearing in the radial direction, a cylindrical wall portion 14 is extending downward in the axial direction and opposing the outer peripheral surface of the sleeve 2 with a gap interposed therebetween. The taper portion 13 of the sleeve 2 and the cylindrical wall portion 14 of the hub 4 together form a seal for preventing leakage of the lubrication fluid 31. The seal utilizes a capillary mechanism.

By employing such a collared outer cylindrical member 3, an area of the thrust bearing becomes large compared to those in the conventional spindle motors shown in FIGS. 9 through 12. The surface shape of the thrust bearing and the process precision of the thrust dynamic pressure generating grooves can be improved. Furthermore, when the thrust dynamic pressure generating groove 11 is formed on the collared outer cylindrical member 3, the thrust dynamic pressure generating groove can be formed by inexpensive methods such as pressing. Thus, it becomes possible to try to reduce the process cost.

Employing the collared outer cylindrical member 3 further enables to readily form communicating holes 12 for communication between an outer peripheral surface of the shaft 1 and an inner peripheral surface of the collared outer cylindrical member 3 and between a lower surface of the rotor hub 4 and an upper surface of a collar portion of the collared outer cylindrical member 3 such that a fluid can flow therethrough. Thus, a pressure difference between the lower portion of the radial bearing and the outer peripheral portion of the thrust bearing is compensated through the communicating holes 12 even when the pressure difference is generated in the lubrication fluid 31 which is held between the hydrodynamic bearings due to an error in working and the like of the radial dynamic pressure generating grooves 10, the thrust dynamic pressure generating grooves 11 and other components. Bubbles due to a negative pressure in the lubrication fluid 31 and the case of excessive floating of the rotor can be suppressed.

In the conventional spindle motor shown in FIGS. 13 and 14, an opening of the communicating hole 30 formed in the outer peripheral portion of the thrust bearing is adjacent to the taper portion of the sleeve which forms a seal. Thus, when the lubrication fluid 31 flows from the lower portion of the radial bearing to the outer peripheral portion of the thrust bearing, the lubrication fluid 31 easily leaks from the seal formed by the taper portion 13 and the cylindrical wall portion 14. On the other hand, in the spindle motor shown in FIGS. 1 and 2, the thrust hydrodynamic bearing is located between the communicating hole opening and the taper portion 13. Thus, the lubrication fluid 31 enters into the thrust hydrodynamic bearing when it flows from the communicating hole. The lubrication fluid 31 is less likely to leak from the seal formed by the taper portion 13 and the cylindrical wall portion 14. Further, in view of circulation of the lubrication fluid 31, it is desirable to form the small space between the lower surface of the collar portion of the collared outer cylindrical member 3 supported without contact and the upper surface of the sleeve 2 so as to be smaller than a gap between the communicating hole 12 and the collared outer cylindrical member 3 to which the hub 4 is attached. The leakage from a gap between the taper portion 13 of the sleeve 2 and the cylindrical wall portion 14 of the hub 4 can be further suppressed.

Embodiment 2

Figure 3:
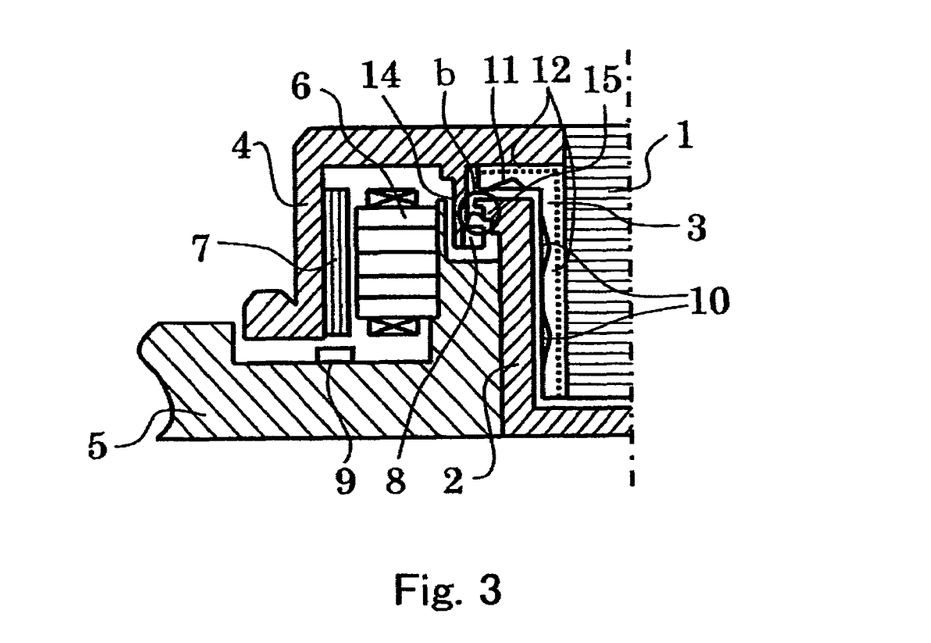
FIG. 3 is a cross-sectional view of a spindle motor according to Embodiment 2 of the present invention.
Figure 4:
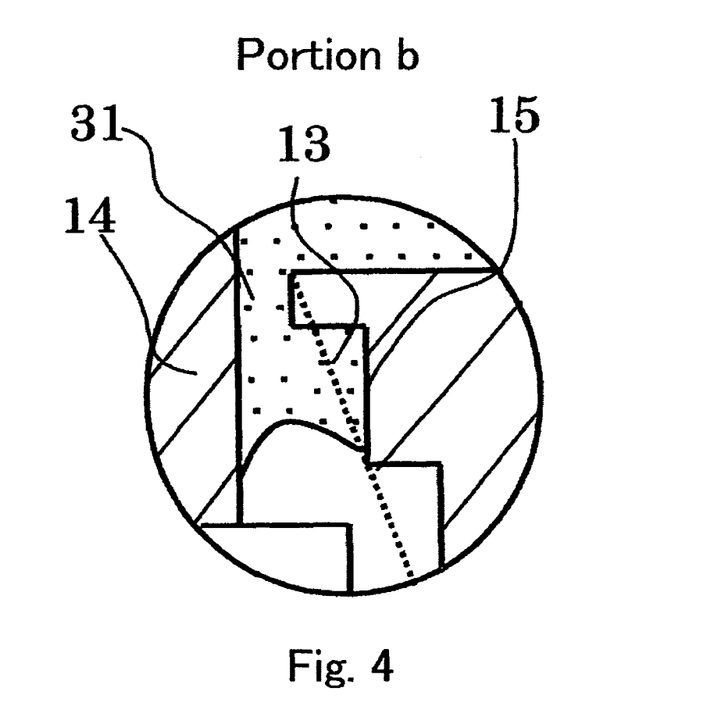
FIG. 4 is an enlarged cross-sectional view showing a portion near a second sealing mechanism according to the present invention.

FIG. 3 is a cross-sectional view of a spindle motor according to Embodiment 2 of the present invention. FIG. 4 is an enlarged view of a portion near a seal. In the spindle motor according to Embodiment 1, the taper portion 13 is formed in the upper outer peripheral portion of the sleeve 2. In the spindle motor of Embodiment 2, instead of the taper portion 13, a stepped portion 15 extending outward with the shaft 1 being the center is provided in the upper outer peripheral portion of the sleeve 2. The stepped portion 15 and the cylindrical wall portion 14 of the hub 4 together form a seal for preventing leakage of the lubrication fluid 31. The seal utilizes a capillary mechanism. A capillary force is proportional to the total area of a surface. Thus, as long as the total area of the surface is the same, reliability with respect to evaporation of oil can be improved by employing a stepped shape instead of a taper shape because more oil can be stored.

Embodiment 3

Figure 5:
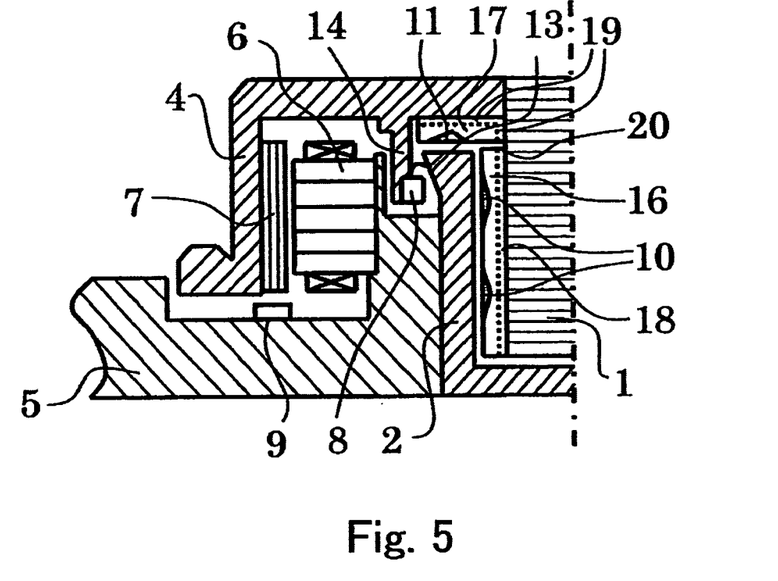
FIG. 5 is a cross-sectional view of a spindle motor according to Embodiment 3 of the present invention.
Figure 6:
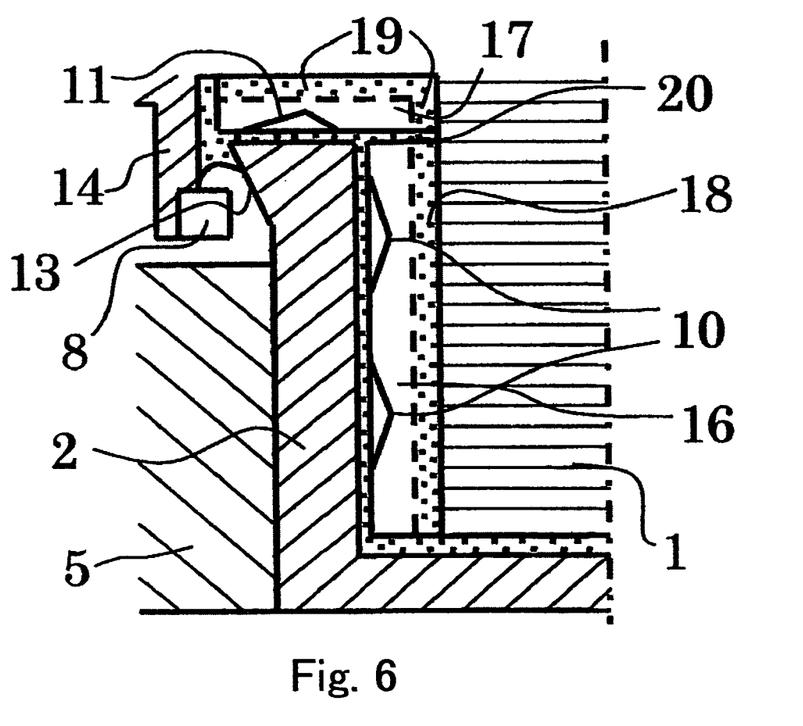
FIG. 6 is an enlarged cross-sectional view showing a portion near a third bearing mechanism according to the present invention.

FIG. 5 is a cross-sectional view of a spindle motor according to Embodiment 3 of the present invention. FIG. 6 is an enlarged view of a portion near a bearing mechanism. The spindle motor shown in FIGS. 5 and 6 includes a shaft 1 and a hub 4 attached to the shaft 1 which form a rotor rotating with the shaft 1 being a central axis. The spindle motor further includes first and second outer cylindrical member 16 and 17 attached to the shaft 1 and a sleeve 2 located outside the first outer cylindrical member 16 with a small space interposed therebetween which form a bearing. The rotor including the shaft 1 is supported so as to be rotatable with respect to the sleeve 2. An outer diameter of the second outer cylindrical member 17 is larger than that of the first outer cylindrical member 16. The sleeve 2 is attached to a base 5 and forms a stator.

On a lower inner peripheral surface of the hub 4, a magnet 7 having a circle shape is attached. The magnet 7 is multipole-magnetized in a circumferential direction. Stator cores 6 are attached to the base 5 at the positions opposing the magnet 7 in the circumferential direction. When controlled currents flow through a plurality of the stator cores 6, a rotational force is generated between the stator cores 6 and the magnet 7 and the stator cores 6 function as a driving mechanism rotating the rotor with respect to the stator.

A lubrication fluid 31 is filled between an outer peripheral surface of the first outer cylindrical member 16 and an inner peripheral surface of the sleeve 2. Radial dynamic pressure generating grooves 10 having a herringbone pattern are formed in two places on at least one of the outer peripheral surface of the first outer cylindrical member 16 and the inner peripheral surface of the sleeve 2. When the first outer cylindrical member 16 rotates, a dynamic pressure is generated between the outer peripheral surface of the first outer cylindrical member 16 and the inner peripheral surface of the sleeve 2 to form a radial hydrodynamic bearing. The radial hydrodynamic bearing allows the first outer cylindrical member 16 to be supported in a radial direction with respect to the sleeve 2 without contact. In Embodiment 3, the radial dynamic pressure generating grooves 10 have a herringbone pattern. However, they may have a spiral pattern or a three circular arc pattern. Further, in Embodiment 3, the radial dynamic pressure generating grooves 10 are formed in two places, but it may be formed in one place or three places or more.

A lubrication fluid 31 is filled between a lower surface of the second outer cylindrical member 17 and an upper surface of the sleeve 2. A thrust dynamic pressure generating groove 11 having a herringbone pattern is formed on at least one of the lower surface of the second outer cylindrical member 17 and the upper surface of the sleeve 2. When the second outer cylindrical member 17 rotates, a dynamic pressure is generated between the lower surface of the second outer cylindrical member 17 and the upper surface of the sleeve 2 to form a thrust hydrodynamic bearing. The thrust hydrodynamic bearing allows the second outer cylindrical member 17 to be supported in an axial direction with respect to the sleeve 2 without contact. In Embodiment 3, the thrust dynamic pressure generating groove 11 has a herringbone pattern. However, it may have a spiral pattern or a step pattern. It is desirable that a pumping-in pattern by which the lubrication fluid 31 is directed inward in the radial direction by a dynamic pressure is used.

A suction ring 9 formed of a magnetic material is attached to the base 5. A magnetic attraction force in the axial direction is generated between the suction ring 9 and the magnet 7. It is balanced with the dynamic pressure generated in the thrust hydrodynamic bearing to stabilize a support of the rotor in the axial direction. Such magnetizing can also be achieved by shifting magnetic centers of the stator core 6 and the magnet 7 in the axial directions.

In an upper outer peripheral portion of the sleeve 2, a taper portion 13 is extending outward with the shaft 1 being the center. On a lower surface of the hub 4 outside the thrust hydrodynamic bearing in the radial direction, a cylindrical wall portion 14 is extending downward in the axial direction and opposing the outer peripheral surface of the sleeve 2 with a gap interposed therebetween. The taper portion 13 of the sleeve 2 and the cylindrical wall portion 14 of the hub 4 together form a seal for preventing leakage of the lubrication fluid 31. The seal utilizes a capillary mechanism. The taper portion 13 may be substituted with the stepped portion 15 described in Embodiment 2.

By employing such first and second outer cylindrical members 16 and 17, an area of the thrust bearing becomes large compared to those in the conventional spindle motors shown in FIGS. 9 through 12. The surface shape of the thrust bearing and the process precision of the thrust dynamic pressure generating grooves can be improved. Furthermore, when the thrust dynamic pressure generating groove 11 is formed on the second outer cylindrical member 17, the thrust dynamic pressure generating groove can be formed by inexpensive methods such as pressing with high precision because the second outer cylindrical member 17 is a disc-shaped member. Thus, it becomes possible to try to reduce the process cost.

Employing the first and second outer cylindrical members 16 and 17 further enables to readily form communicating holes 18 and 19 for communication between an outer peripheral surface of the shaft 1 and an inner peripheral surface of the first outer cylindrical member 16 and between a lower surface of the rotor hub 4 and an upper surface of the second outer cylindrical member 17 such that a fluid can flow therethrough. Thus, a pressure difference between the lower portion of the radial bearing and the outer peripheral portion of the thrust bearing is compensated through the communicating holes 18 and 19 even when the pressure difference is generated in the lubrication fluid 31 which is held between the hydrodynamic bearings due to an error in working and the like of the radial dynamic pressure generating grooves 10, the thrust dynamic pressure generating grooves 11 and other components. Bubbles due to a negative pressure in the lubrication fluid 31 and the case of excessive floating of the rotor can be suppressed.

If a communicating hole 20 is further provided between the first and second outer cylindrical members 16 and 17, pressure differences in both the thrust bearing and the radial bearing can be compensated to reduce an interaction between the thrust bearing and the radial bearing. Thus, it becomes possible to prevent a negative influence such as a negative pressure generated in one bearing from affecting the other bearing.

In the conventional spindle motor shown in FIGS. 13 and 14, an opening of the communicating hole 30 formed in the outer peripheral portion of the thrust bearing is adjacent to the taper portion of the sleeve which forms a seal. Thus, when the lubrication fluid 31 flows from the lower portion of the radial bearing to the outer peripheral portion of the thrust bearing, the lubrication fluid 31 easily leaks from the seal formed by the taper portion 13 and the cylindrical wall portion 14. On the other hand, in the spindle motor shown in FIGS. 5 and 6, the thrust hydrodynamic bearing is located between the communicating hole opening and the taper portion 13. Thus, the lubrication fluid 31 enters into the thrust hydrodynamic bearing when it flows from the communicating hole. The lubrication fluid 31 is less likely to leak from the seal formed by the taper portion 13 and the cylindrical wall portion 14. Further, in view of circulation of the lubrication fluid 31, it is desirable to form the small space between the lower surface of the second outer cylindrical member 17 supported without contact and the upper surface of the sleeve 2 so as to be smaller than a gap between the communicating hole 19 and the second outer cylindrical member 17 to which the hub 4 is attached. The leakage from a gap between the taper portion 13 of the sleeve 2 and the cylindrical wall portion 14 of the hub 4 can be further suppressed.

Embodiment 4

Figure 7:
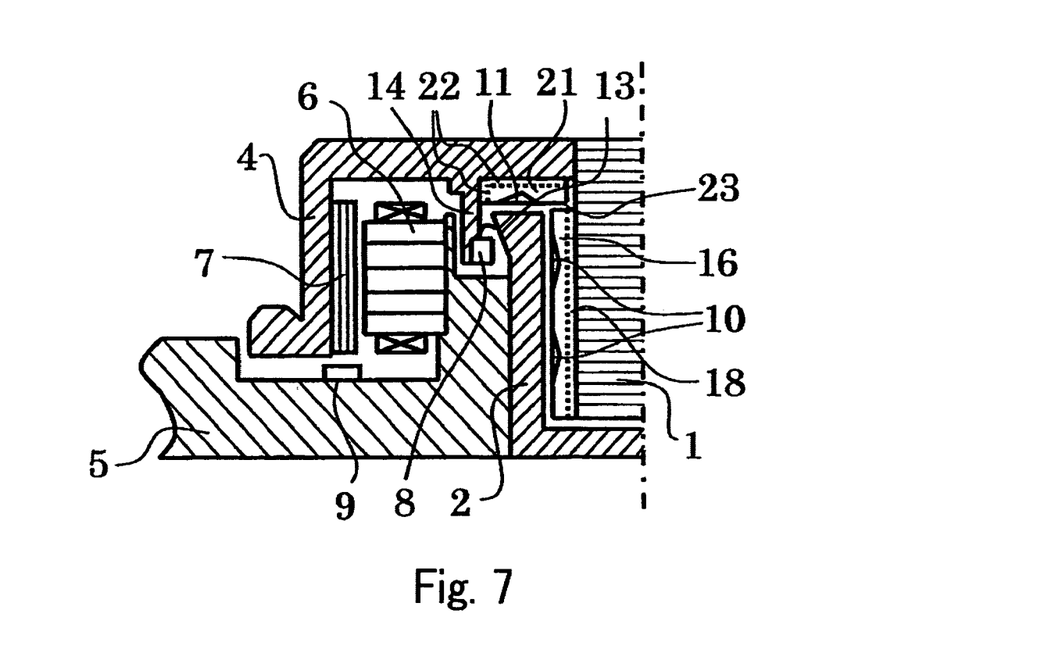
FIG. 7 is a cross-sectional view of a spindle motor according to Embodiment 4 of the present invention.
Figure 8:
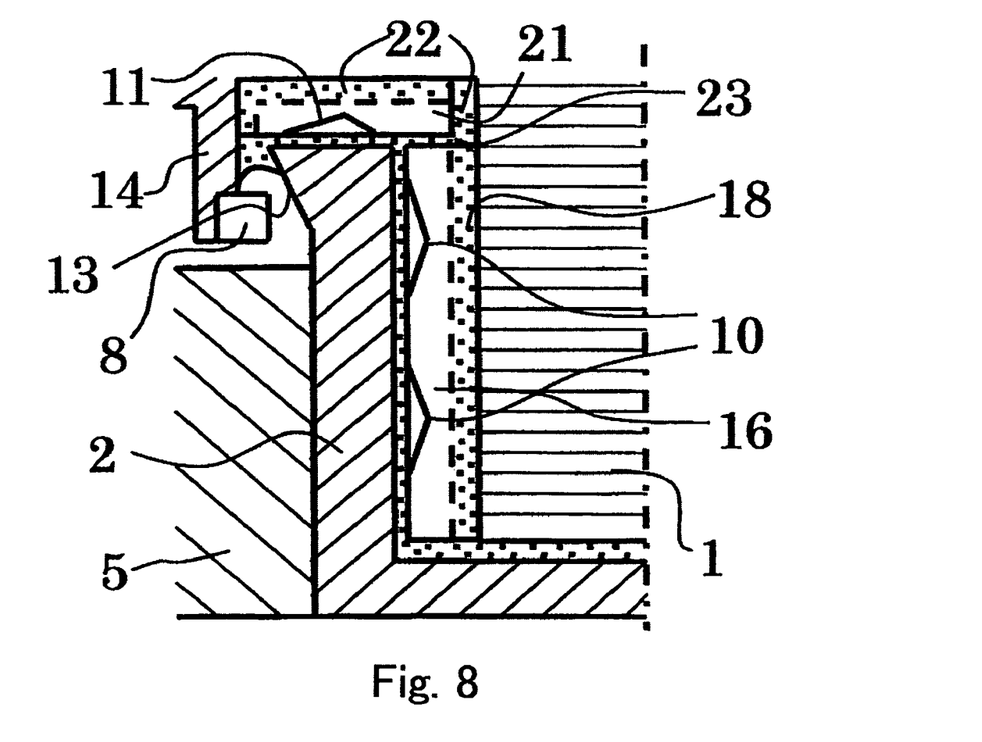
FIG. 8 is an enlarged cross-sectional view showing a portion near a fourth bearing mechanism according to the present invention.

FIG. 7 is a cross-sectional view of a spindle motor according to Embodiment 4 of the present invention. FIG. 8 is an enlarged view of a portion near a bearing mechanism. In the spindle motor according to Embodiment 3, the first outer cylindrical member 16 and the second outer cylindrical member 17 are attached to the shaft 1. In the spindle motor of Embodiment 4, the first outer cylindrical member 16 is attached to the shaft 1 and an inner cylindrical member 21 is attached to an inner periphery of the cylindrical wall portion 14 of the hub 4. In other words, the second outer cylindrical member 17 in Embodiment 3 is substituted with the inner cylindrical member 21. The thrust hydrodynamic bearing is formed between a lower surface of the inner cylindrical member 21 and the upper surface of the sleeve 2. A larger area for attachment between the inner cylindrical member 21 and the hub 4 can be secured compared to an area for attachment between the second outer cylindrical member 17 and the shaft 1. Thus, attachment strength can be improved.

Embodiments 1 through 4 relate to spindle motors of an external rotor type with shaft revolution. However, they can also be applied to shaft-fixed type motors or motors of an internal rotor type.

The outer cylindrical members and the inner cylindrical member described in Embodiments 1 through 4 may be formed of any of porous metal materials, copper or copper-based materials, stainless steels, and resin materials.

Furthermore, a retention portion 8 protruding inward in the radial direction may be formed integrally or separately on a tip of the cylindrical wall portion 14 described in Embodiments 1 through 4. The retention portion 8 is formed such that it locates below the taper portion 13 or the stepped portion 15 of the sleeve in the axial direction. The position of an inner peripheral portion of the retention portion 8 in the radial direction is inside the outermost position of the taper portion 13 or the stepped portion 15 in the radial direction. The retention portion 8 imposes a limit on a relative position of the rotor to the stator in the axial direction. It becomes possible to prevent the rotor from moving out of the stator.

Bearing devices according to the present invention and spindle motors using the same can be used as rotational driving apparatuses of HDDs, polygon mirrors, optical disc apparatuses and the like.

The present invention is applicable to spindle motors particularly suitable for hard disc apparatuses and other types of devices, but is not limited to such devices.

What is claimed is:

1. A spindle motor comprising a stationary member and a rotational member which is rotatable with respect to the stationary member via a radial bearing portion and a thrust bearing portion, wherein:
    the rotational member includes a shaft, and an outer cylindrical member and a rotor hub attached to the shaft, the outer cylindrical member being formed of an cylindrical portion and a collar portion extending from one end of the cylindrical portion in a direction perpendicular to an outer peripheral surface;
    the stationary member includes a sleeve member having an inner peripheral surface opposing an outer peripheral surface of the cylindrical portion of the outer cylindrical member in a radial direction, and an upper surface opposing a lower surface of the collar portion of the outer cylindrical member in an axial direction;
    the radial bearing portion is formed of a fluid between the outer peripheral surface of the cylindrical portion of the outer cylindrical member and the inner peripheral surface of the sleeve opposing it in the radial direction, and a dynamic pressure generating groove formed on at least one of the outer peripheral surface of the cylindrical portion of the outer cylindrical member and the inner peripheral surface of the sleeve; and
    the thrust bearing portion is formed of a fluid between the lower surface of the collar portion of the outer cylindrical member and the upper surface of the sleeve opposing it in the axial direction, and a dynamic pressure generating groove formed on at least one of the lower surface of the collar portion of the outer cylindrical member and the upper surface of the sleeve.

2. A spindle motor according to claim 1, comprising a communicating hole for communication between an outer peripheral surface of the shaft and an inner peripheral surface of the outer cylindrical member, and between a lower surface of the rotor hub and an upper surface of the outer cylindrical member such that a fluid can flow therethrough.

3. A spindle motor according to claim 1, wherein the outer cylindrical member and the inner cylindrical member are formed of a porous metal material.

4. A spindle motor according to claim 1, wherein the outer cylindrical member and the inner cylindrical member are formed of copper or a copper-based material.

5. A spindle motor according to claim 1, wherein the outer cylindrical member and the inner cylindrical member are formed of a stainless steel.

6. A spindle motor according to claim 1, wherein the outer cylindrical member and the inner cylindrical member are formed of a resin material.

7. A spindle motor according to claim 1, wherein:
    a cylindrical wall portion extending downward in the axial direction and opposing an outer peripheral surface of the sleeve with a gap interposed therebetween is formed on the lower surface of the rotor hub outside the thrust bearing portion in the radial direction; and
    a seal portion utilizing a capillary mechanism is provided between an inner peripheral surface of the cylindrical wall portion and the outer peripheral surface of the sleeve.

8. A spindle motor according to claim 7, wherein the seal portion includes at least one stepped portion on at least one of the inner peripheral surface of the cylindrical wall portion and the outer peripheral surface of the sleeve such that a gap between the inner peripheral surface of the cylindrical wall portion and the outer peripheral surface of the sleeve gradually increase as it becomes far from the thrust bearing portion.

9. A spindle motor according to claim 7, wherein the seal portion includes at least one taper portion on at least one of the inner peripheral surface of the cylindrical wall portion and the outer peripheral surface of the sleeve such that a gap between the inner peripheral surface of the cylindrical wall portion and the outer peripheral surface of the sleeve gradually increase as it becomes far from the thrust bearing portion.

10. A spindle motor according to claim 1, wherein a rotor magnet is attached to the rotating member and a stator core is attached to a position on the stationary member which opposes the rotor magnet.

11. A rotation apparatus according to claim 10, wherein a rotated body such as polygon mirrors or recording discs is attached to the rotating member.

* * * * *